United States Patent [19]

Corsmeier et al.

[11] Patent Number: 4,934,888
[45] Date of Patent: Jun. 19, 1990

[54] FASTENER RETAINER ASSEMBLY

[75] Inventors: Robert J. Corsmeier, Cincinnati; George J. Johnson, Morrow; John Mac Richey, Cincinnati, all of Ohio

[73] Assignee: General Electric Company, Cincinnati, Ohio

[21] Appl. No.: 138,247

[22] Filed: Dec. 28, 1987

[51] Int. Cl.⁵ .................... F16B 21/18; F16B 39/00
[52] U.S. Cl. .................... 411/353; 411/107; 411/517; 411/999
[58] Field of Search .............. 411/352, 353, 512, 516, 411/517, 999, 103, 107, 112, 105, 519

[56] References Cited

U.S. PATENT DOCUMENTS

| | | | |
|---|---|---|---|
| 2,767,950 | 10/1956 | Bellon et al. | 411/999 X |
| 2,919,736 | 1/1960 | Kann . | |
| 2,922,456 | 1/1960 | Kann | 411/353 |
| 3,045,265 | 7/1962 | Seibert et al. | 411/517 X |
| 3,137,336 | 6/1964 | Wing | 411/999 X |
| 3,217,774 | 11/1965 | Pelochino . | |
| 3,221,794 | 12/1965 | Acres . | |
| 3,289,726 | 12/1966 | Sauter | 411/999 X |
| 3,397,727 | 8/1968 | Orosz | 411/999 X |
| 4,285,380 | 8/1981 | Gulistan | 411/103 |
| 4,324,517 | 4/1982 | Dey | 411/353 |
| 4,464,090 | 8/1984 | Duran | 411/103 |
| 4,594,040 | 6/1986 | Molina | 411/353 |

Primary Examiner—Neill R. Wilson
Attorney, Agent, or Firm—Jerome C. Squillaro; Steven J. Rosen

[57] ABSTRACT

A retainer assembly for retaining a bolt in engagement with a first member during assembly or after disassembly of the first member from a second member comprises a retainer formed with a throughbore and an annular slot at one end of the throughbore, a bolt having a shank formed with a smooth section, a threaded section and a groove therebetween, and a triangular-shaped locking ring which is carried within the slot formed in the retainer. The threaded section of the shank of the bolt is first inserted through the locking ring and then into the throughbore of the retainer for mounting within a threaded bore formed in a second member. Upon disassembly of the bolt from the second member, the bolt is moved in the opposite direction along the throughbore of the retainer until the locking ring engages the groove in the shank of the bolt which prevents disengagement of the bolt from the retainer.

10 Claims, 1 Drawing Sheet

U.S. Patent     Jun. 19, 1990     4,934,888
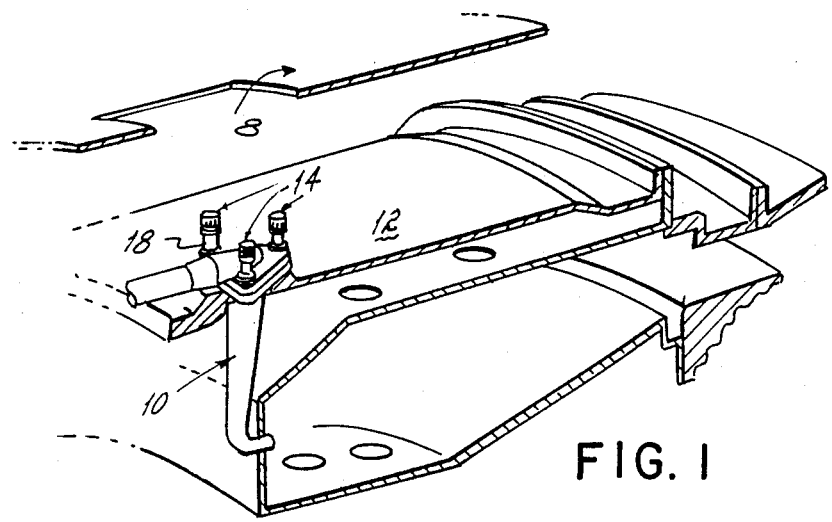
FIG. 1
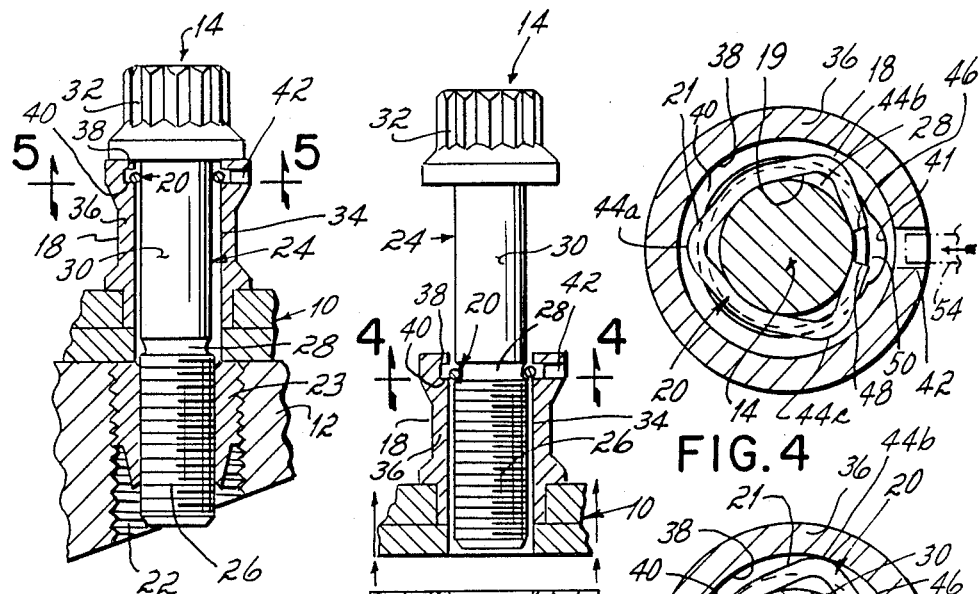
FIG. 2
FIG. 3
FIG. 4
FIG. 5

FASTENER RETAINER ASSEMBLY

The Government has rights in this invention pursuant to Contract No. F33657-83-C-0281 awarded by the Department of Air Force.

FIELD OF THE INVENTION

This invention relates to fastener retainer assemblies, and, more particularly, to structure for retaining a fastener such as a bolt in engagement with a first member during assembly or after disassembly of the first member from a second member.

BACKGROUND OF THE INVENTION

Bolts continue to be one of the most commonly used fasteners for removably securing a first member to a second member. They are relatively light in weight, provide a secure means of attachment and add shear load capability to the connection between the members to be joined together.

One problem with standard bolts, and bolted connections between two members, is that it can be difficult to manipulate the bolts during assembly and disassembly without dropping them. This is particularly true where the bolted connection is in a location which is difficult to reach and requires the use of a long wrench or a socket with a long extension. In some applications, such as the bolted connection between the fuel nozzle and engine case in a jet engine, as well as a variety of other bolted connections in jet engines, it is critical that the bolts not be dropped into the engine casing during their assembly and disassembly. Bolts which are mishandled during maintenance procedures and drop into the engine casing must be retrieved or catastrophic damage may occur to the engine during operation. This adds substantially to the time and effort involved in the maintenance procedure.

Fastener or bolt retainer assemblies have been proposed in the prior art to eliminate or at least reduce the chance of a bolt becoming disengaged from a first member as it is either assembled or disassembled from a second member. In many prior art designs, the shank of the bolt is formed with a groove which mates with a locking ring carried within a throughbore formed either in the first member or a retainer mounted to the first member. The bolt is inserted into the throughbore and through the locking ring so that its threaded portion mates with a correspondingly threaded bore in the second member. Upon removal of the bolt from the second member, the groove in the shank of the bolt engages the locking ring to prevent removal of the bolt from the first member or retainer. See, for example, U.S. Pat. No. 3,221,794 to Acres; U.S. Pat. Nos. 2,919,736 and 2,922,456 to Kann; and U.S. Pat. No. 3,217,774 to Pelochino.

One factor which complicates the design of a bolt retainer assembly where the first and second members are to be connected by a number of bolts is the "true position" tolerance of the bores in the second member to which the first member is mounted. The "true position" tolerance refers to the true or actual position of the bores formed in the second member compared to their position as designed and shown in assembly drawings for a particular part. The true or actual position of the bores varies from their design position within a certain tolerance, depending upon the part, and this tolerance must be accommodated by the bolt retainer in order to mount the first member to the second member. Usually, the true position tolerance is accommodated by making the bores in the retainer or first member larger than the bores in the second member so that the bolts can be shifted to a limited degree within the retainer or first member and aligned with the corresponding bores in the second member.

The true position tolerance is not accommodated in retainer assembly designs such as shown in the '794 patent to Acres. In this design, the bore in the first member is only slightly larger than the bore in the second member. A circular locking ring is movable with the shaft of the bolt and is carried within the bore of the first member. The bore in the first member of the Acres patent is too small to permit shifting of the bolt position to accommodate misalignment of the bore in the second member, and thus is only useful in application where a single bolt mounts the first and second members. If the bore in the first member of the Acres design was made larger in an attempt to adapt such structure for applications requiring a number of bolts, the circular locking ring could not be retained therein and would be ineffective to prevent disengagement of the bolt from the first member.

The problem of accommodating the true position tolerance of bores formed in the second member is recognized in the remaining patents cited above. The retainer assemblies disclosed in such patents each include a bore in a first member or retainer which is larger in diameter than the bore in the second member within which the bolt is threaded. The problem with these designs, however, is that the structure for retaining the bolt to the first member prior to assembly or after disassembly is relatively complicated, expensive and employs a number of different parts. Additionally, the parts must all be secured during flight or engine operation to avoid or reduce the destructive effects of vibratory stresses. The use of multiple parts to retain the bolt in place, which themselves might be lost during assembly and disassembly, is unacceptable and presents the same danger in jet engines as mishandled bolts.

SUMMARY OF THE INVENTION

It is therefore among the objectives of this invention to provide a retainer assembly for a fastener such as a bolt which retains the bolt in place during assembly and disassembly of one member to a second member, which requires a minimum number of parts, which produces minimal vibratory stresses, and which is relatively economical to manufacture and easy to install.

These objectives are accomplished in a retainer assembly which comprises a retainer formed with a throughbore and an annular slot at one end of the throughbore, a bolt having a shank formed with a smooth section, a threaded section and a groove therebetween, and a triangular-shaped locking ring which is carried within the slot formed in the retainer. The threaded section of the shank of the bolt is first inserted through the locking ring and then into the throughbore of the retainer for mounting within a threaded bore formed in a second member. Upon disassembly of the bolt from the second member, the bolt is moved in the opposite direction along the throughbore of the retainer until the locking ring engages the groove in the shank of the bolt which prevents disengagement of the bolt from the retainer.

An important aspect of this invention is predicated upon the concept of accommodating true position tolerance of the threaded bores formed in the second member within which the bolts are mounted. In order to permit movement of the bolts into alignment with the threaded bores in the second member, the diameter of each throughbore in the retainer is greater than the diameter of the corresponding threaded bores in the second member. As a result, each of the bolts carried by the retainer can be shifted to align with a respective threaded bore in the second member to accommodate the tolerance between the true or actual position of the threaded bores in the second member and their design position.

In order to avoid disengagement of a bolt from the retainer, the locking ring is triangular in shape, i.e., its outer side is formed with three spaced lobes or projections which ride within the slot formed in the retainer. The inner side of the locking ring rides against the shank of the bolt and is sized to snap into the groove formed therein. This structure permits shifting of the bolt within the relatively large throughbore of the retainer, but the bolt is captured by the locking ring to avoid disengagement from the retainer. The snap fit is sufficiently tight to hold the locking ring against the surface of the shank to reduce or eliminate vibration such as during the operation of a jet engine. This will reduce or eliminate vibratory stresses acting on the locking ring which may cause it to fail.

In the presently preferred embodiment, the locking ring is split at one location forming opposed ends with a gap therebetween. A port is formed in the retainer which intersects the groove therein. In the initial insertion of the bolt within the retainer, a pin is extended through the port in the retainer and into the gap formed by the spaced ends of the locking ring. The pin prevents rotation of the locking ring relative to the bolt and thus allows the threaded portion of the bolt to be threaded through the locking ring and into the throughbore of the retainer. The groove in the shank of the bolt then engages the locking ring but it can be disengaged therefrom by forceably pushing downwardly on the head of the bolt. The bolt is then torqued down the remaining distance into the throughbore so that the smooth portion of its shank slides along the locking ring until the head of the bolt engages the top of the retainer. The torquing action threads the bolt into the corresponding threaded bore of the second member thereby completing the attachment of the first member to the second member.

In removing the bolt from the second member, the bolt is threaded out of the bore in the second member and moved in the opposite direction along the throughbore in the retainer until the groove in the shank of the bolt engages the locking ring. Since the locking ring tightly engages the shaft of the bolt, it snaps into the groove in the bolt and prevents disengagement of the bolt from the retainer. In addition, the locking ring is rotatable within the slot formed in the retainer to prevent the bolt from rotating relative to the locking ring and moving out of the retainer.

DESCRIPTION OF THE DRAWINGS

The structure, operation and advantages of the presently preferred embodiment of this invention will become further apparent upon consideration of the following description taken in conjunction with the accompanying drawings, wherein:

FIG. 1 is a perspective view of a portion of a jet engine illustrating the mounting of a fuel nozzle to the engine case employing the bolt retainer assembly of this invention;

FIG. 2 is a cross sectional view of the retainer assembly herein with the bolt connected to the engine case;

FIG. 3 is a view similar to FIG. 2 with the bolt in an unassembled position;

FIG. 4 is a cross sectional view taken generally along line 4—4 of FIG. 3; and

FIG. 5 is a cross sectional view taken generally along line 5—5 of FIG. 2.

DETAILED DESCRIPTION OF THE INVENTION

Referring now to FIG. 1, a schematic view of a portion of a jet engine including an engine case 8 is shown which illustrates the mounting of a fuel nozzle 10 to the combustor case 12. As shown, three bolts 14 are required to mount the fuel nozzle 10 to the combustor case 12 and it is critical that the bolts 14 be prevented from disengagement during assembly or disassembly of the fuel nozzle 10 so that they do not fall into the engine and create a problem during its operation. It should be understood that the particular application of mounting a fuel nozzle 10 to a combustor case 12 is intended to illustrate but one use of this invention, and it is contemplated that essentially any two members could be mounted by the retainer assembly herein.

Referring now to FIGS. 2-5, the retainer assembly comprises a bolt 14, a retainer 18 and a locking ring 20. The retainer 18 is mounted to or forms an integral part of the fuel nozzle 10 in the illustrated embodiment. The combustor case 12 is formed with a threaded bore 22 which receives a lock nut 23 adapted to mount the bolt 14 as described below.

The bolt 14 is formed with a shank 24 having a threaded section 26, an annular groove 28 and a smooth section 30 terminating with a head 32. The threaded section 26 extends from one end of the shank 24 along a portion thereof and the annular groove 28 is formed in the shank 24 where the threaded section 26 terminates. In order to avoid a stress concentration at the annular groove 28, the diameter of the shank 24 at the annular groove 28 is greater than or equal to the minor diameter of the shank 24 within the threaded section 26.

The retainer 18 is formed with a throughbore 34 which defines a cylindrical wall 36. The diameter of the throughbore 34 is greater than the internal diameter of the lock nut 23 in combustor case 12 to accommodate the true position tolerance of threaded bore 22 and lock nut 23 as described above. An annular slot 38 is formed in the cylindrical wall 36 of the throughbore 34 at one end which extends radially outwardly therefrom forming an annular shoulder 40. A tool access port 42 is formed in the retainer 18 which intersects the annular slot 38. The top of retainer 18 is formed with a recess 41 which extends downwardly and intersects slot 38.

As best shown in FIGS. 4 and 5, the locking ring 20 has an outer side 21 formed in a generally triangular shape having three spaced lobes or projections 44a-c which are spaced approximately 120° apart. The locking ring is split at one location between lobes 44b, c forming opposed ends 46, 48 defining a gap 50 therebetween. The inner side 19 of locking ring 20 is engageable with the shank 24 of the bolt 14, and is sized to snap-fit within the annular groove 28 formed in the shank 24. As shown in FIG. 4, with the locking ring 20 received within the groove 28 of bolt 14, the gap 50 between ends 46, 48 is relatively small. When the locking ring 20 engages the smooth section 30 of bolt shank 24, as shown in FIG. 5, the ends 46, 48 are forced apart which increases the gap 50 therebetween.

The retainer assembly operates in the following manner. Initially, the locking ring 20 is inserted into the annular slot 38 in the retainer 18 through the recess 41 formed at the top of retainer 18. In order to insert the bolt 14 into the retainer 18, a rod or pin 54 is extended through the port 42 in retainer 18 and into the gap 50 between the opposed ends 46, 48 of the locking ring 20. This prevents the locking ring 20 from rotating and allows the bolt 14 to be rotated so that its threaded section 26 extends through the locking ring 20.

Once the threaded section 26 of bolt 14 is extended through the locking ring 20 and into the throughbore 34 of retainer 18, the locking ring 20 snaps into the annular groove 28 formed in the bolt shank 24. This engagement between the locking ring 20 and bolt 14 prevents removal of the bolt 14 from the retainer 18. As a result, maintenance personnel are freed from having to manipulate the bolt 14 during the assembly or disassembly procedure.

The retainer 18 and fuel nozzle 10 mounted thereto are then secured to the combustor case 12 by first pushing the bolt 14 downward into the throughbore 34 of retainer 18 so that the locking ring 20 disengages the groove 28 in the bolt shank 24. The bolt 14 is then rotated so that its threaded section 26 is received within the lock nut 23 carried in the threaded bore 22 of combustor case 12. The bolt 14 is rotated until its head 32 engages the top of retainer 18.

When the bolt 14 is backed out of the lock nut 23 for disassembly of the fuel nozzle 10 from the combustor case 12, the shank 24 moves upwardly within the retainer 18 until the locking ring 20 snaps into the annular groove 28 in the bolt shank 24. This prevents the bolt 14 from disengaging the retainer 18 either by pulling directly outwardly on the bolt 14 or attempting to rotate the bolt 14. Although the bolt 14 can be pulled outwardly so that the locking ring 20 disengages the annular groove 28, the threaded section 26 of the bolt 14 immediately engages the locking ring 20 and prevents it from being pulled any further out of the retainer 18. Rotation of the bolt 14 is also ineffective to remove it from retainer 18 because the locking ring 20 is rotatable with the bolt 14 within the annular slot 38 in retainer 18. This prevents the bolt 14 from being threaded through the locking ring 20 and out of the retainer 18.

Accordingly, in order to disengage the bolt 14 from retainer 18, the pin 54 is inserted through the port 42 and into the gap 50 between the ends 46, 48 of locking ring 20 to prevent the locking ring 20 from rotating with the bolt 14. This allows the bolt to be threaded out of the locking ring 20 and retainer 18.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, it is contemplated that the retainer assembly of this invention could employ a standard bolt without a groove 28 in the shank of the bolt. In that case, the threaded portion of such bolt is directly engaged by the locking ring 20 to prevent the bolt from escaping the retainer 18. The groove 28 is helpful in the preferred embodiment herein to prevent the threaded section 26 of bolt 14 from engaging the locking ring 20, which, if the locking ring 20 somehow became wedged in slot 38, might lead to disengagement of the bolt 14 from retainer 18. It is unlikely that this would occur, and therefore the groove 28 could be omitted from the bolt 14 without departing from the scope of this invention.

Therefore, it is intended that the invention not be limited to the particular embodiment disclosed as the best mode contemplated for carrying out this invention, but that the invention will include all embodiments falling within the scope of the appended claims.

We claim:

1. A retainer assembly adapted to retain a bolt used to mount a first member to a second member, comprising:
    a retainer having a throughbore forming a cylindrical wall, said retainer being formed with a slot in said cylindrical wall extending radially outwardly from said throughbore, said retainer being carried on said first member;
    a locking ring having an inner side adapted to constantly engage a bolt and an outer side formed with at least one projection, said projection on said outer side of said locking ring being carried within said slot formed in said cylindrical wall of said retainer, said locking ring being retained in a fixed axial position relative to said retainer within said slot and being rotatable relative to said retainer within said slot;
    the bolt being adapted to be inserted through said locking ring and into said bore in said retainer, the bolt having a threaded portion engageable with a threaded bore in a second member, the bolt being adapted to be threaded out of engagement with said bore in the second member and moved along said throughbore in said retainer so that said locking ring engages the threaded section of the bolt and prevents disengagement of the bolt from said retainer.

2. A retainer assembly for mounting a first member to a second member, comprising:
    a retainer having a throughbore forming a cylindrical wall, said retainer being formed with a slot in said cylindrical wall extending radially outwardly from said throughbore, said retainer being carried on said first member;
    a bolt having a shank formed with a head, a threaded section and a groove;
    a locking ring having an inner side constantly engageable with said shank of said bolt and an outer side formed with at least one projection, said projection on said outer side of said locking ring being carried within said slot formed in said cylindrical wall of said retainer, said locking ring being retained in a fixed axial position relative to said retainer within said slot and being rotatable relative to said retainer within said slot;
    said bolt being insertable through said locking ring and into said throughbore in said retainer, said threaded portion of said bolt being adapted to engage a threaded bore formed in a second member, said bolt being adapted to be threaded out of engagement with the threaded bore in the second member and moved along said throughbore in said retainer so that said locking ring engages said groove in said shank of said bolt to prevent disengagement of said bolt from said retainer.

3. The retainer assembly of claim 2 in which said retainer is fixedly mounted to said first member.

4. The retainer assembly of claim 2 in which said slot formed in said cylindrical wall of said retainer is annular and forms an annular shoulder extending radially outwardly from said throughbore in said retainer.

5. The retainer assembly of claim 4 in which said outer side of said locking ring is triangular-shaped forming three spaced projections, said projections being carried upon said annular shoulder formed in said cylindrical wall of said retainer.

6. The retainer assembly of claim 2 in which said locking ring is split to form opposed ends with a gap therebetween.

7. The retainer assembly of claim 6 in which said retainer is formed with an access port which intersects said slot, said access port being adapted to receive a pin insertable within said gap between said opposed ends of said locking ring, said pin preventing said locking ring from rotating while said threaded section of said shank of said bolt is inserted through said locking ring.

8. The retainer assembly of claim 2 in which said retainer is formed with a recess intersecting said slot to facilitate insertion of said locking ring into said groove.

9. The retainer assembly of claim 2 in which said throughbore in said retainer has a larger diameter than the threaded bore in the second member and a larger diameter than said shank of said bolt.

10. A bolted assembly, comprising:
   a first element adapted to be mounted to a second element, said first element having a throughbore forming a cylindrical wall, said first element being formed with a slot in said cylindrical wall extending radially outwardly from said throughbore;
   a bolt having a shank formed with a head, a threaded section and a groove;
   a locking ring having an inner side constantly engageable with said shank of said bolt and an outer side formed with at least one projection, said projection on said outer side of said locking ring being carried within said slot formed in said cylindrical wall of said first element, said locking ring being retained in a fixed axial position relative to said first element and being rotatable relative to said retainer with said slot;
   said bolt being insertable through said locking ring and into said throughbore in said first element, said threaded portion of said bolt being adapted to engage a threaded bore formed in said second element, said bolt being adapted to be threaded out of engagement with the threaded bore in the second element and moved along said throughbore in said first element so that said locking ring engages said groove in said shank of said bolt to prevent disengagement of said bolt from said first element.

* * * * *